United States Patent Office 3,794,504
Patented Feb. 26, 1974

3,794,504
FAST SETTING, CRACK RESISTANT CEMENTITIOUS COMPOSITION HAVING INHIBITED SHRINKAGE
Henry Nash Babcock, 4 Quintard Ave.,
Greenwich, Conn. 06830
No Drawing. Filed Feb. 24, 1969, Ser. No. 801,781
The portion of the term of the patent subsequent to
Aug. 4, 1990, has been disclaimed
Int. Cl. C04b 7/02
U.S. Cl. 106—87
11 Claims

ABSTRACT OF THE DISCLOSURE

A cementitious composition suitable for repairing highway and being capable of developing sufficent strength to withstand normal traffic in less than two hours is prepared from a hydraulic cement mixture with a chemical analysis of $SO_3$ less than about 2.0% by weight of the cement in which a sufficient amount of fluid coke to offset the shrinkage during setting and early hardening are mixed therewith. The early strength of the resultant patch can be further improved by the addition therein and mixed therewith up to 100% by weight of the cement, a pressure-calcined gypsum. The addition of pressure-calcined gypsum to the composition also substantially reduced the long-term shrinkage of the resultant patch.

(1) FIELD OF THE INVENTION

This invention relates to improvements in aqueous hydraulic cement mixtures such as concrete, mortar, grout and products made from them, architectural stone, concrete block, terrazzo, concrete pipe, asbesto-cement, and the like. More particularly, it relates to a cementitious composition which when mixed with water is capable of setting at a relatively short period to a hard mass without substantial shrinkage during setting and early hardening, and with reduced long-term shrinkage.

The term "hydraulic cement" as used herein, is intended to include any cement which has the characteristic of hardening under water, e.g., portland cement, blends of portland cement and natural cement, air-entraining portland cement, pozzolanic cement, slag cement, masonry cement, oil well cement, white portland cement, colored cement, anti-bacteria cement, waterproofed cement, a mixture of portland cement and blast-furnace cement, and like materials.

The term "concrete" is used to designate a mixture of hydraulic cement, aggregate and water, which sets to form a hard mass. Concrete may contain either mineral or non-mineral aggregate, including naturally occurring materials, for instance, sand and gravel or quarried rock, or manufactured aggregate such as expanded shale, clay, or the like.

The term "mortar" is used herein to designate a mixture of hydraulic cement, fine aggregate and water, and the term "grout" designates a mixture of hydraulic cement and water, and sometimes fine sands. Grouts normally have higher fluidity than mortars and can be pumped through pipe lines and forced into small spaces, for instance, into voids or cracks or porous concrete, or into spaces between preplaced aggregate.

(II) DESCRIPTION OF THE PRIOR ART

In the construction industry, and particularly for highway repairs, there has been a long felt need for a cementitious composition which can be set within a relatively short period into a hard mass with sufficent strength to withstand normal traffic. In order to have commercial value, this type of cementitious composition, which is commonly called highway patch must have good bonding characteristics, early as well as long-term strength and a practical field workability time, and is capable of withstanding freezing and thawing and the action of salts. Advantageously, the cementitious composition should possess self-leveling properties so that the resultant patch when used in highway repair would not create cavities or crown which would cause damage to the adjacent area of the highway under traffic conditions.

Attempts have been made to formulate a highway patch which may possess a combination of the above properties. Compounds such as calcium chloride and other known accelerators have been used in the prior formulations. These attempts, however, have not been completely satisfactory, due largely to the considerable shrinkage, high heat generation, and lack of freezing and thawing resistance of the resultant patch. Plastic formulations for highway repairs prepared from plastics such as polyepoxy have also been used; however, the lack of compatibility and breathability have precluded the extended use of this type of formulation.

SUMMARY OF THE INVENTION

I have discovered that an ideal patch can be obtained from a cementitious composition comprising a hydraulic cement mixture with a chemical analysis of $SO_3$ less than about 2.0% by weight and an admixture comprising a sufficient amount of a particulate material having a volume of entrapped gas and being capable of releasing at least a major portion of said gas to offset the shrinkage during setting and early hardening of said cementitious composition while in contact with water. Advantageously, a pressure-calcined gypsum in an amount up to about 100% by weight of the cement may be mixed therewith to improve the early strength of the resultant patch and to reduce or to eliminate the long-term shrinkage.

By using a hydraulic cement mixture with $SO_3$ content lower than in normal hydraulic cements and in combination with a particular type of gas releasing aggregates, I have discovered that not only a patch with early strength can be obtained therefrom, the resultant patch has substantially no shrinkage during setting and early hardening and, if pressure-calcined gypsum is used therewith, substantially reduced long-term shrinkage. The patch has excellent bonding strength and can be adjusted to bear normal traffic 30 to 60 minutes after the patch is placed on the highway. Due to low or no shrinkage of the highway patch of this invention, the undesirable slight depression or crowning in normal repair works is eliminated. Furthermore, the resultant patch has unusual freezing and thawing properties and excellent resistance to the action of salts.

DESCRIPTION OF THE PREFERRED EMBODIMENTS

The hydraulic cement suitable for the present invention must have a $SO_3$ analysis lower than about 2.0% and preferably lower than about 1.8%. Cement with finer grinds, in the range of 5000 Blaine fineness, is generally preferred for the manufacturing of the cementitious composition of this invention. I found Type III cement to be eminently suitable. Other types of cements, with proper adjustment of $C_3A$ and perhaps with fine grinding, may also be used. It is noted that in the manufacturing of hydraulic cement, the $SO_3$ content in the resultant product is difficult to predict. The $SO_3$ content in the cement is contributed partially from the raw material used to prepare the clinker and predominantly from the gypsum added into the clinker before fine grinding. Usually, in each batch, the $SO_3$ therein may vary within the range of 2 to 3%. In most types of cements, the minimum amount of $SO_3$ is generally about 2.5%.

In selecting the hydraulic cement for preparing the cementitious composition of this invention, I use hydraulic cement having chemical analysis of $SO_3$ below about 2.0% by weight of cement, preferably below and 1.8%. Cements containing lower amount of $SO_3$ may also be used. The advantage of using hydraulic cement with lower $SO_3$ resides in the flexibility that it offers to the final user in altering the setting time of the cementitious composition. For example, hydraulic cement containing $SO_3$ too low for proper set within a predetermined working period may be adjusted by blending the low $SO_3$ cement with a normal hydraulic cement, such as Type III. It is apparent that by proper blending of cements with low $SO_3$ content with regular cement, a final composition containing proper amount of $SO_3$ below about 2.0% may be obtained.

The hydraulic cement used in preparing the cementitious composition of this invention should contain sufficient amount of gypsum to avoid a flash set. In general, the amount of gypsum therein should be sufficient so that the initial set is formed in ten minutes. Listed below is a table of the setting time obtained with various amounts of gypsum added to a hydraulic cement prepared substantially devoid of added gypsum.

TABLE I

| Percent of gypsum— | Water to cement ratio | Initial set, minutes |
|---|---|---|
| 0.72 | 6:1 | 10 |
| 0.8 | 3.9:1 | 11 |
| 0.8 | 5:1 | 22 |
| 0.8 | 6:1 | 25 |
| 1.03 | 3.9:1 | 25 |
| 1.03 | 5:1 | 40 |
| 1.2 | 4.8:1 | 45 |
| 1.8 | 4.5:1 | 60+ |

A typical hydraulic cement suitable for the present invention has the following chemical analysis:

TABLE II

| | Chemical analysis |
|---|---|
| $SiO_2$ | 21.66 |
| $Al_2O_3$ | 5.31 |
| $Fe_2O_3$ | 1.85 |
| $CaO$ | 63.89 |
| $MgO$ | 3.62 |
| $SO_3$ | 1.61 |
| L.O.I. | 0.42 |
| Insol residue | 0.84 |
| $C_3S$ | 52.3 |
| $C_2S$ | 23.0 |
| $C_3A$ | 10.9 |

The particulate material used in the admixture, preferably, is a solid adsorbent having surface properties for preferential adsorption of water and for discharging the gas entrapped thereby. The preferred adsorbents include silica gel, activated alumina, activated bauxite, activated carbon, delayed coke, and particularly fluid coke. While delayed coke and fluid coke are characterized as "adsorbents" for the purposes of the invention herein, it is to be understood that they may or may not be considered industrial adsorbents by others.

This type of particulate material has a porous structure with open cells for entrapping a large volume of gas which is releasable to the cementitious system during setting and early hardening when water in the cementitious mixture is being adsorbed by the particulate material. Broadly construed, the suitable particulate materials may be considered as solid adsorbents with a high degree of selectivity for water or moisture adsorption. However, it is understood that the particulate materials suitable for this invention may not be considered by or used in the industry as solid adsorbents.

The effective particulate material for eliminating the shrinkage of the cementitious system should have a sufficiently large volume of releasable entrapped gas so that only relatively small amounts of this shrinkage preventive additive have to be used to offset the contracted volume in a cementitious system during setting and early hardening.

While the exact nature why certain particulate materials can be used effectively with low $SO_3$ cement to produce a desirable highway patch is not completely understood, it is believed that the suitable particulate material has certain surface properties which preferentially adsorb water to cause the discharge of the gas initially entrapped in the material, either by a simple displacement action or by a combination of displacement and capillary actions due to the change of environment conditions during the setting and early handling of the cementitious system, which offset to a limited extent the fast setting caused by the low gypsum content in the cement and to a large extent the shrinkage resultant therefrom. I found by using a low $SO_3$ cement in combination with the gas release particulate material, a fast setting cementitious composition with self-leveling properties, excellent bonding strength, as well as good freezing and thawing properties can be thus obtained.

The major types of adsorbents that may be used in this invention include activated alumina and bauxite, alumina-silicate, bone char, wood char, activated carbon, magnesia, silica gel, magnesium silicate, delay coke and fluid coke. Some of these adsorbents require special treatment before they become suitable for controlling the shrinkage of the cementitious system. The treatment, however, generally involves simply drying the additive to reduce the moisture content therein to below about 3% by weight. The aforesaid adsorbents, with the exception of fluid coke, are available commercially in a variety of grades and particle sizes and generally have low moisture content, so further treatment is not required. Although the size of these adsorbents is not critical, we prefer to use adsorbents with a majority of their particle below about 20 mesh and more preferably below about 50 mesh. Within the size range selected, these adsorbents will provide a sufficiently fast release rate so that a major portion of the entrapped gas will be released while the cementitious system is still in a plastic state.

The fluid coke suitable for the present invention is a by-product of the fluid coking process for the thermal conversion of heavy hydrocarbon oils to lighter fractions. The fluid coke part of the process generally uses a fluidized bed reactor in combination with a burner vessel. The seed coke which is used as a catalyst in the fluidized bed reactor is initially heated in the burner vessel and is then fed into the reactor where the coke comes in contact with the raw preheated feed stock. The feed stock, upon contact with the coke particles, is partially cracked and the lighter fractions are flashed off. Additional coke is formed, both as seed coke and in the growth of the heated coke particles coming from the burner vessel. The new coke is deposited on the seed coke in onion-like uniform layers. The excess coke thus formed in the reactor is tapped off and quenched. The fluid coke recovered is in a hard spherical form. Screen analysis of one sample was found to be:

| | Percent |
|---|---|
| Coarser than 30 mesh | 1.2 |
| Passed through 30 mesh retained on 50 mesh | 86.1 |
| Passed through 50 mesh retained on 100 mesh | 7.8 |
| Passed through 100 mesh | 5.2 |

The chemical analysis of the coke generally shows about 90% carbon, but the ash in crude feed stock will, of course, determine the chemical analysis of the ash of the coke, so wide variations are to be expected. The ash content, however, is very low and usually is less than about 0.5%.

The coke produced in the fluid coking process is normally stock-piled in open space and is shipped to the coke users by rail in hopper cars. As a result of the exposed storage, the moisture content of the coke runs approximately 5% by weight, and generally fluctuates in the range of 3% to 7%, depending on the local weather conditions when the coke is exposed. Under certain conditions of high humidity or excess rain, the moisture content may exceed the upper limit of 7% by weight. Even at this high moisture content, however, the coke is free flowing and dry to the touch.

To practice the present invention, the fluid coke is preferably dried to eliminate substantially all the water contained therein. Advantageously, the fluid coke is dried in a suitable drier, such as a rotory kiln, at a temperature preferably above 250 degrees F. and for a period sufficient to drive out substantially all the moisture. The drying temperature, of course, should not be so high as to cause fusion or combustion of the coke particles. After essentially all the moisture is removed, it is important that the resultant dried fluid coke is allowed to cool in dry air for a period sufficiently long, thereby allowing the dried coke particles to absorb air and to establish essentially an equilibrium with the ambient conditions. It has been found that the expansion activity of the fluid coke when used immediately after it is dried is drastically reduced, as compared with the fluid coke which is allowed to cool to ambient temperature prior to its application as an admixture in the cementitious system, according to the present invention.

When cooling the dried fluid coke under normal low humidity conditions, e.g., 70 to 80 degrees F. and 10 to 30% relative humidity, the coke regains less than about 1% by weight of volatilizable substance, which is predominately air and possibly a small amount of water. It is, therefore, not necessary to take special precaution for cooling the dried fluid coke under normal drying-plant conditions where the ambient humidity is reasonably low. However, in hot and humid conditions, special precaution must be taken during the cooling of the fluid coke. In the laboratory experiments, it was found that the amount of moisture that can be re-absorbed by dried fluid coke during cooling can exceed 9% by weight for a 24-hour period under conditions near 100% relative humidity and at about 80 degrees F. Under these, or even less severe conditions, it is advantageous to cool the dried fluid coke in a space wherein the humidity is extremely low or readily controllable, so that the resultant moisture content of the fluid coke is less than 3% and preferably less than about 1% by weight.

The amount of the adsorbent to be used depends on the shrinkage characteristics of the particular cementitious system and also, to a large extent, the amount of evaporation taking place. In general, the amount of fluid coke admixture of this invention required for controlling the setting shrinkage of a cementitious system with a "normal amount of evaporation" is less than 10% by weight of the cement, provided, of course, that the moisture content of the coke is below about 3% by weight. The term "normal amount of evaporation" stated hereinabove refers to the amount of water evaporated at the first 3½ hours during setting and early hardening of the concrete mass at ambient conditions of 70 to 80 degrees F. and 10 to 30% relative humidity. The amount of water evaporated under laboratory conditions stated above is less than 0.5% of the total weight of the aqueous hydraulic mixture. In actual practice, the amount of fluid coke used may be much less than 10% if the moisture content of the fluid coke is controlled to below the preferred range of 1%.

Under "no evaporation" conditions, which is recommended for setting almost all types of cement mixtures but is seldom practiced or realized in the actual field conditions, further reduction of the amount of admixture to be used can be realized.

To further illustrate this invention, specific examples are described herein below:

EXAMPLE 1

A highway patch prepared by mixing 45 pounds of cement having the chemical analysis stated in Table II, 50 pounds of sand, and 5 pounds of fluid coke were mixed with water and installed over a traffic area. Within one hour, traffic was resumed. There was no apparent damage to the patch. After placement of the patch, a linseed oil solution was coated on the patch to avoid rapid evaporation. It was noted after 28 days that there were no cracks apparent in the patch, and the patch bonded to the substrata with no apparent separation.

A similar patch was placed on a bituminous surface with similar results.

EXAMPLE 2

Cubes were prepared from compositions similar to the one stated in Example 1. Compressive tests performed in accordance with ASTM standards, Proctor and Gilmore tests, as well as Proctor penetration readings are as follows:

TABLE III.—ASTM TEST

|  | P.s.i. |
|---|---|
| 1 hour | 147 |
| 2 hours | 164 |
| 6 hours | 225 |
| 1 day | 4000 |
| 2 days | 6250 |
| 28 days | 9500 |

| Proctor: | Minutes |
|---|---|
| Initial set: | 25 |
| Final set: | 37 |
| Gilmore: | |
| Initial set: | 37 |
| Final set: | 47 |
| Proctor compression readings: | P.s.i. |
| 0 to 24 minutes | 0 |
| 25 minutes | 600 |
| 33 minutes | 1800 |

A light beam test was used to measure shrinkage of one sample of mix from the time of adding water. It was noted that no shrinkage was observed. This self-leveling property is extremely important for highway patch because it substantially eliminates cavity.

It was also noted that highway patch prepared according to this invention has low sensitivity to water. Normally, in a cementitious mixture, the more water that is added to the concrete, the slower is the set. In the cementitious composition of this invention, increasing the water to cement ratio from 4 to 5 changes the setting time from 25 to 40 minutes. The use of higher water to cement ratios, of course, has the advantage of increasing the workability.

To improve the early strength of the highway patch, pressure-calcined gypsum may be used in combination with hydraulic cement without substantially reducing the $SO_3$ content therein. The pressure-calcined gypsum for the invention is a product marketed by the United States Gypsum Company under the trade name of Hydro-Stone. The amount of pressure-calcined gypsum that can be used for preparing this composition may vary within a wide range. The amount of pressure-calcined gypsum used in combination with hydraulic cement having normal $SO_3$ contents must be sufficient to provide the required early strength for the normal traffic. I found a range between 15% and 100% by weight of the cement to be eminently suitable. When pressure-calcined gypsum is used with a cement having $SO_3$ content below about 2.0%, it provides initially a certain amount of early strength, but more important, it reduces the long-term shrinkage of the resultant patch. The amount of pressure-calcined gypsum that should be used may range from 5% to about 100% of the cement used. Generally, it is preferred to use 25% to 75% by weight of the cement in composition. Described herein below are tests illustrating the elimination of long-term shrinkage cracking by using pressure-calcined gypsum in the cementitious system of this invention.

I placed a wooden tongue depressor in a plastic cup and filled the cup with various cement mixtures. These mixtures were as follows:

Mix I: 42½ pounds of high-early-strength cement, 50 pounds of silica sand, and 7½ pounds of fluid coke.

Mix II: Our recently developed highway patch of 45 pounds of low $SO_3$ cement, 50 pounds of sand, and 5 pounds of fluid coke.

Mix III: Mix I with the addition of 25 pounds of Hydro-Stone.

Mix IV: Mix II with the addition of 25 pounds of Hydro-Stone.

All the mixes without Hydro-Stone showed considerable radial cracking extended from a centrally placed wooden stick to the perimeter of the cup under air dry conditions. Test Series III and IV showed absolutely no cracking.

A more severe crack test was also run, using a mix composed as in Tests I and II above and a standard grout mix, and adding approximately 25 pounds of pressure-calcined gypsum to 100 pounds of the grout mix identified above. These various mixes were placed around a jelly glass, which itself was placed upside down in a square plastic container.

Cement mixtures tested in the past have developed cracks within several days where the jelly glass is closest to the edge of the container. This is an extremely severe test, because as the concrete dries and tries to shrink, it is restrained from doing so by the jelly glass. In the mix where pressure-calcined gypsum was added, absolutely no cracks have developed with air curing. All other mixes have developed severe cracking.

All of the above mixes (I, II, III and IV) and variations thereof have run through freeze-thaw cycles. With the use of fluid coke in the pressure-calcined cementitious mixtures, we have had no noticeable deterioration during freezing and thawing. This is unusual for any high gypsum mix.

Using pressure-calcined gypsum in various proportions with a grout mix as the template, I bonded the pressure-calcined grout mixes to previously cast, smooth grout samples. The mixes developed such a firm bond to the grout that within twenty-five minutes, it could not be removed by hand pressure. Comparable cement mixes without pressure-calcined gypsum would be readily separated at the joint during this period of time under the same pressure.

A compression test on various pressure-calcined gypsum proportions, from 5 to 50% of the grout mix, took tremendous force to break the bond. At the joint between the pressure-calcined gypsum cementitious mixture and the grout mixture, a clamp was installed on the test sample. The clamp was tightened until it was firmly attached to opposite sides of the joint on the sample.

Regular cementitious mixtures separate immediately on the slightest tightening of the clamp. The pressure-calcined gypsum mixes broke after tremendous pressure. The clamp handle was moved between 180 and 270 degrees before fracture. It was impossible under this test to fracture the sample using 30% pressure-calcined gypsum.

Using between 5 and 50% pressure-calcined gypsum, the samples usually fractured at an angle through the joint. This meant that the bond between the two specimens was as strong as the internal particle bond in the high-strength grout mix.

Further tests were run on placing of these Hydro-Stone cement formulations. These Hydro-Stone mixes were diluted with water until they were flowable and then placed on both slick and rough concrete samples without any prior wetting. Within one hour the Hydro-Stone sample could not be dug off, with a screwdriver acting as a lever. It has been normal procedure through the history of concrete to wet the substrate before placement of a new concrete mix in order to develop a bond. This is not necessary with our Hydro-Stone patch.

The setting of the cementitious composition of this invention is relatively fast; it can, however, be slowed down by using retardents, such as sodium citrate, to obtain whatever setting time is required.

I claim:

1. A cementitious composition which when mixed with water is capable of setting in less than two hours into a hard mass without substantial shrinkage during setting and early hardening, said composition comprising a Type III hydraulic cement mixture with a chemical analysis of $SO_3$ less than about 2.0% and an admixture comprising a sufficient amount of a particulate material having a volume of entrapped gas and being capable of releasing at least a major portion of said gas to offset shrinkage during setting and early hardening of said cementitious composition while in contact with water.

2. A cementitious composition according to claim 1 wherein said particulate material is one having surface properties for preferential adsorption of water and for discharging the gas entrapped thereby.

3. A cementitious composition according to claim 2 wherein the solid adsorbent is activated bauxite.

4. A cementitious composition according to claim 2 wherein the solid adsorbent is activated alumina.

5. A cementitious composition according to claim 2 wherein the solid adsorbent is activated carbon.

6. A cementitious composition according to claim 2 wherein the solid adsorbent is silica gel.

7. A cementitious composition according to claim 2 wherein the solid adsorbent is delayed coke.

8. A cementitious composition according to claim 1 wherein the particulate material is fluid coke.

9. A cementitious composition according to claim 8 wherein the fluid coke has a moisture content less than 3%, the amount of the fluid coke is less than about 10% by weight of the cement.

10. A cementitious composition according to claim 9 wherein the particle size of the fluid coke is predominately below 20 mesh.

11. A cementitious highway patch composition which can be set in less than about one hour to a hard mass sufficient to withstand normal traffic without substantial shrinkage during setting and early hardening and with reduced long-term shrinkage, said patch composition comprising a Type III hydraulic cement mixture with a chemical analysis of $SO_3$ less than about 1.8% and an admixture comprising a sufficient amount of fluid coke being capable of offsetting shrinkage during setting and early hardening.

References Cited

UNITED STATES PATENTS

| | | | |
|---|---|---|---|
| 2,609,882 | 9/1952 | Morgan et al. | 106—97 |
| 3,234,035 | 2/1966 | Small et al. | 106—89 |
| 3,503,767 | 3/1970 | Gaines et al. | 106—89 |
| 3,519,449 | 7/1970 | Babcock. | |

OTHER REFERENCES

Lea and Deseh, "The Chemistry of Cement and Concrete," Edw. Arnold and Sons, p. 153 (1956).

JAMES E. POER, Primary Examiner

U.S. Cl. X.R.

106—89, 97, 98

UNITED STATES PATENT OFFICE
CERTIFICATE OF CORRECTION

Patent No. 3,794,504          Dated February 26, 1974

Inventor(s) Henry Nash Babcock

It is certified that error appears in the above-identified patent and that said Letters Patent are hereby corrected as shown below:

Column 4, line 27, "delay" should read -- delayed --.

Column 8, line 37, Claim 7, "2" should read -- 1 -- and line 38 "solid adsorbent" should read -- particulate material --.

Signed and Sealed this

Seventh Day of September 1976

[SEAL]

Attest:

RUTH C. MASON
*Attesting Officer*

C. MARSHALL DANN
*Commissioner of Patents and Trademarks*